May 5, 1925.  1,536,055
K. W. BARTLETT
LIQUID TREATING APPARATUS
Filed Jan. 30, 1923

Inventor:
Kent W. Bartlett
By J. L. Gragg, Atty.

Patented May 5, 1925.

1,536,055

UNITED STATES PATENT OFFICE.

KENT W. BARTLETT, OF HAMMOND, INDIANA.

LIQUID-TREATING APPARATUS.

Application filed January 30, 1923. Serial No. 615,835.

*To all whom it may concern:*

Be it known that I, KENT W. BARTLETT, citizen of the United States, residing at Hammond, in the county of Lake and State of Indiana, have invented a certain new and useful Improvement in Liquid-Treating Apparatus, of which the following is a full, clear, concise, and exact description.

My invention relates to liquid treating apparatus employing a storage tank that receives the liquid to be treated and in which treatment is effected, a source of chemical discharged into the treatment tank, and mechanism governed by the raw liquid for maintaining the proportioning of raw liquid and chemical substantially constant.

Hitherto it was possible so to vary the pressure upon the treated liquid being discharged, as by means of a pump, as to permit the incoming raw liquid to be received at a rate in excess of the capacity of the apparatus. This would prevent or disturb the proper action of chemical upon the liquid since the reaction time would be reduced.

My invention is of particular service in connection with water softening apparatus and in accordance with the preferred embodiment of the invention the softened water is received in a discharge pipe having a receiving opening that is above the outlet pipe and sufficiently below the lower limiting level of the liquid in the treatment tank as to maintain a natural gravity pressure or head upon the outgoing softened water which will prevent the softened water from being removed from the treatment tank beyond the predetermined rate so as to maintain the reaction time intact.

In the preferred embodiment of the invention a discharge pipe is employed that has an upright portion desirably located wholly within the treatment tank and terminating above or at the upper limiting level in the tank and there open to the air. This pipe portion within the treatment tank has a liquid receiving opening in its side that is located a desired distance below the lower limiting level of the treatment tank to provide the desired head upon the outgoing liquid. If it is sought to increase the natural flow of the outgoing liquid by pump pressure it is obvious that this undesired result cannot be secured except by the amount of liquid in the pipe that is above said liquid receiving opening.

Figure 1:
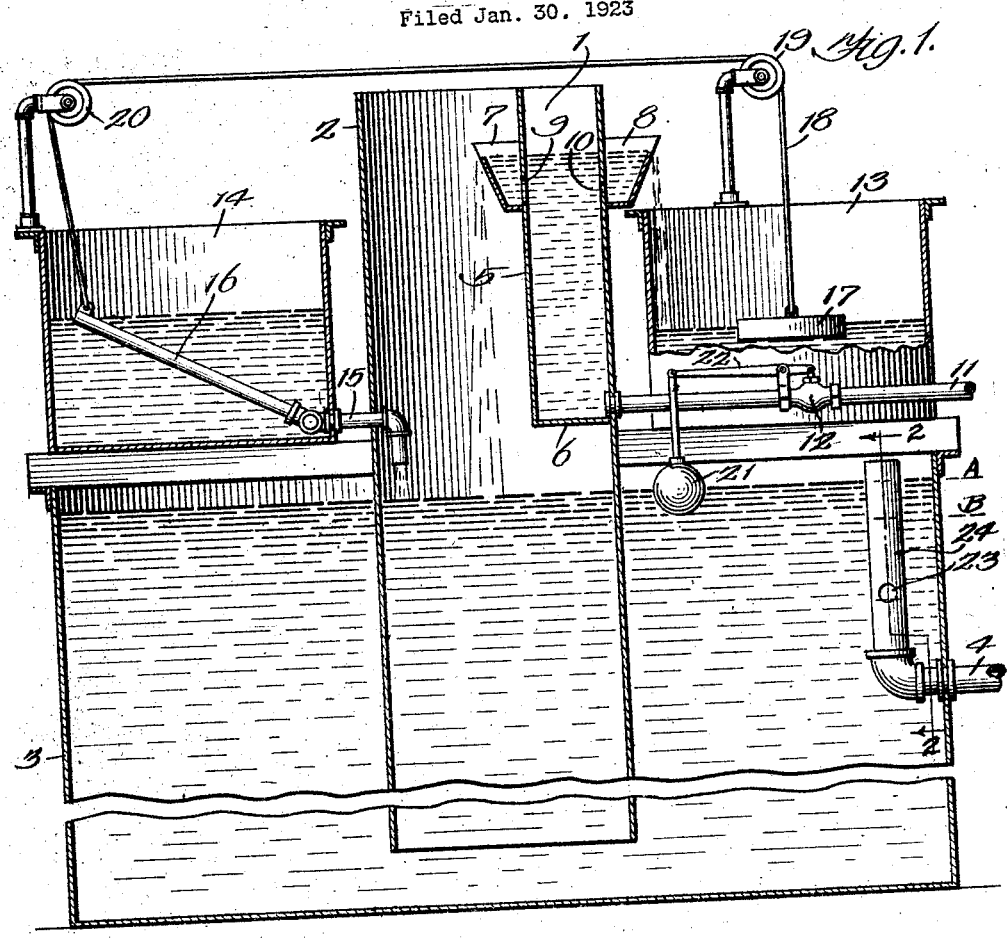
Figure 2:
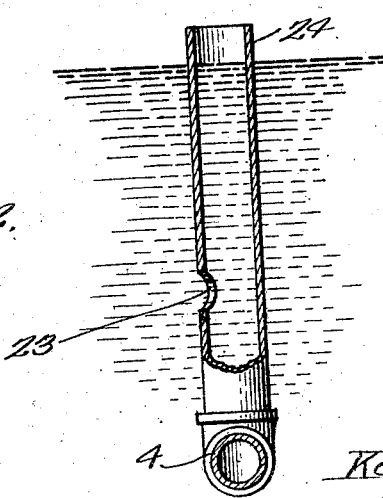

I will explain my invention more fully by reference to the accompanying drawing in which Fig. 1 is a vertical sectional view, somewhat diagrammatic, illustrating the preferred embodiment of the invention as parts of the equipment being shown in full elevation; and Fig. 2 is a sectional view, on a larger scale, on line 2—2 of Fig. 1.

Like parts are indicated by similar characters of reference in both figures.

The water softening or liquid treating apparatus illustrated includes a riser 1 which is desirably formed within and includes a portion of the cylindrical wall of the larger riser 2 projecting into the treatment and storage tank 3, the major portions of the chemical reactions occurring in the riser 2 to soften the water therein, the softened water flowing to the space surrounding the riser 2 and being discharged from the treatment tank through the outlet pipe 4 to be used for the purpose for which the water is softened.

As illustrated, the riser 1 includes an upright wall 4 and a bottom wall 6, these two walls being located at the upper portion of the riser 2 and co-operating with a portion of the cylindrical wall thereof to form the riser 1. Two containers 7 and 8 receive the raw water from the riser 1 which is formed with a larger opening 9 discharging into the container to which it is individual and both openings are below the limiting level of each container.

A supply pipe 11 is connected with the city water main or any other source of raw water that is to be softened, a valve 12 being included in the pipe for regulating the volume of water flowing therethrough. This pipe discharges into the riser 1 below the openings 9 and 10 and terminates above the containers 7 and 8 so as to furnish a head to force the flow of water through said openings and over the rims of the containers. The container 7 overflows into the treatment tank and the container 8 overflows into the float tank 13. Chemical is also admitted to the treatment tank from the chemical tank 14 that discharges through the outlet 15. The flow of chemical through the outlet is regulated by the position of the swinging pipe section 16 that is in communication with the outlet 15. As will appear, this swinging pipe section is lowered as the amount of raw water supplied for treatment increases to maintain the proportion of chemical and raw water substantially constant. A float 17 floats in the raw water admitted to the float tank 13. A cable 18 is connected at one end with the float and passes over the pulleys 19 and 20 into connection with the outer or unanchored end of the swinging pipe section 16. Obviously, raw water flows into the treatment tank and float tank in fixed proportion with less water flowing into the float tank than into the treatment tank owing to the difference in the sizes of the openings 9 and 10. As the water in the float tank 13 rises the float 17 will rise to permit the pipe 16 to lower gradually to increase the rate of flow of chemical into the treatment tank. A float 21 floats in the softened water in the treatment tank, this float being carried upon an arm 22 that is coupled with the valve 12 in a manner to decrease the rate of flow of incoming raw water as the float 21 rises.

The float 21 will be lifted by the water in the treatment tank, when it reaches the upper limiting level A, to close the valve 12. When softened water has been removed to an extent to bring the water in the treatment tank to the lower limiting level B, the float 21 will be lowered to permit the valve 12 to be fully opened, the opening action of the valve being gradual from its closed to its fully opened position. The receiving orifice 23 is formed through a side of the upright discharge pipe 24 that discharges into the outlet pipe 4 that is beneath pipe 24. The head of the water above the center of the receiving orifice 23 is sufficient to maintain the rate of flow of the outgoing treated water through this orifice equal to the rate of flow of the raw water being supplied to the tank, the rate of flow of the raw water into the machine and the rate of flow of treated water from the machine being equal and never exceeding the rated capacity of the machine after water reaches level B.

When the machine is at rest, a column of water is located in the discharge piping 24 not only in the portion of this piping that is below the water receiving opening 23 but in the portion of this piping that intervenes between this opening and the limiting levels A and B above it.

When softened water is being taken from the machine the water in the piping 24 will drop with reference to the level of the surrounding water to a point corresponding to the required head which cannot be effectively greater than the head of water upon the outside of the pipe above the opening 23. The slight increment of water flowing through the pipe 24 from the portion thereof above the opening 23 is negligible and only occurs when the machine is first started.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Liquid treating apparatus including a treatment tank; a source of chemical; piping for conveying liquid to be treated to the tank; mechanism governed by liquid passing through said piping operating to maintain the proportioning of liquid and chemical substantially constant; mechanism governed by the liquid in the treatment tank for cutting off and establishing flow of liquid to the treatment tank; an upright discharge pipe having a liquid receiving opening through its side and between its ends and positioned to receive treated liquid from the treatment tank and located below the lower limiting level of the liquid in the tank and having an opening at the upper limiting level of the liquid in the tank to have its contents subject to atmospheric pressure; and an outlet pipe below and communicating with the lower end of said discharge pipe.

2. Liquid storing apparatus including a storage tank; piping for conveying liquid to the tank; mechanism governed by the liquid in the tank for cutting off and establishing flow of liquid to the tank; and discharge piping having a liquid receiving opening positioned to receive liquid from the tank and located below the lower limiting level of the liquid in the tank and having an opening at the upper limiting level of the liquid in the tank to have its contents subject to atmospheric pressure.

In witness whereof, I hereunto subscribe my name this 15th day of January A. D. 1923.

KENT W. BARTLETT.